J. BRIGGLE.
Horse-Tail Protector.
No. 212,836. Patented Mar. 4, 1879.
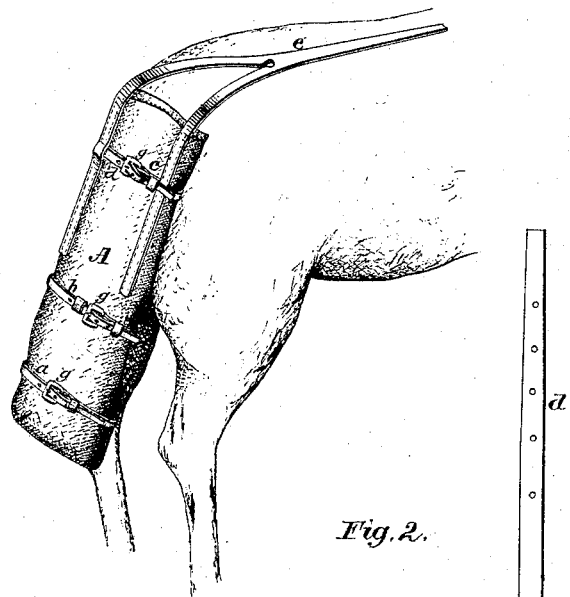
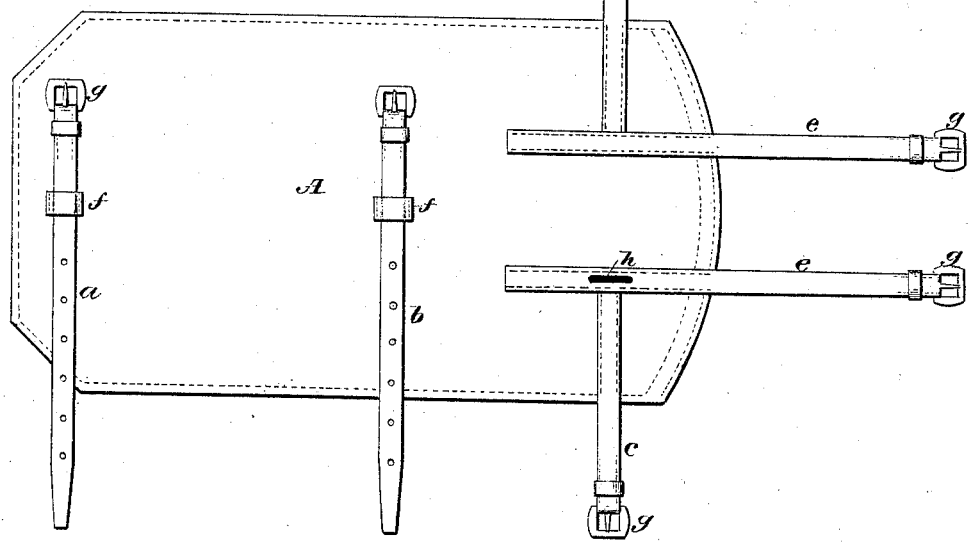
Attest:
J. H. Kaiser
D. P. Cone
Inventor:
Jacob Briggle

UNITED STATES PATENT OFFICE.

JACOB BRIGGLE, OF WASHINGTON, PENNSYLVANIA.

IMPROVEMENT IN HORSE-TAIL PROTECTORS.

Specification forming part of Letters Patent No. 212,836, dated March 4, 1879; application filed December 19, 1878.

*To all whom it may concern:*

Be it known that I, JACOB BRIGGLE, of Washington, in the county of Washington and State of Pennsylvania, have invented a new and useful Improvement in Horse-Tail Protectors, of which the following is a full and exact description, which will enable one skilled in the art to make and use the same.

Figure 1 represents the protector placed over the horse's tail and attached to the harness, and Fig. 2 an elevation of the protector when spread out.

My invention relates to attachments to harness for the purpose of protecting horses' tails from mud and other filth, as well as from sleet and snow, when they are driven on the road, and from being rubbed accidentally when horses are shipped in cars, or intentionally, (as some horses are inclined to rub,) when standing in stables; also, keeping the tail clean and soft, free from tangles and filth; and it consists in devices hereinafter described and claimed.

In the drawings, A is the main part or body of the protector, and may be made of rubber cloth, ducking, sail-cloth, or any suitable material which is impervious to mud, and is flexible, so as to be readily folded about the tails of horses. In actual use, A is about two feet three inches long and about one foot wide. $a$ $b$ $c$ $d$ $e$ $e$ are straps. $ff$ are loops, under or through which straps $a$ and $b$ freely slip. $a$ and $b$ are furnished with buckles $g$ at one end. $c$ and $d$ and $e$ $e$ are sewed securely to A. $c$ and $e$ $e$ are furnished with buckles $g$. $c$ and $d$ are sewed to A at about one-third of its width from the edges. At the sewed end of $c$ is a slot, $h$, for $d$ to pass through, as hereinafter described. $e$ $e$ may be made as one strap, forked so as to be secured to A at the proper places.

The operation is as follows: The device is attached, by means of buckles $g$ on $e$ $e$, to the crupper-strap of a saddle or harness, or it may be attached by means of a single buckle on the crupper-strap or back-strap when made of one strap, having a forked end for attachment to A; then the sides of the upper part of A are folded around the tail, and strap $d$ is passed up through slot $h$ and buckled with strap $c$; then the protector A is turned up out of the way of the fleshy part of the tail, while the long hair of the tail is laid up in a fold over the fleshy part of the tail, without being secured by any tying; then the protector is turned down over the tail thus folded up, and the sides of the protector are folded around the tail and strap $b$ is buckled; then turn or fold the lower end of A—say about two inches or more, according as the fleshy part of the tail is longer or shorter—up inwardly or toward the horse, and buckle strap $a$ around the fold, thus closing the lower end of the protector.

It is unnecessary to undo any buckles to remove the protector, as upon the removal of the harness the tail pulls out of the protector.

When the protector is used on horses not saddled or harnessed, a surcingle and crupper may be used to which to secure the protector.

The protector may be made only about half the described length when used in stables or cars, as it is then unnecessary to fold the tail up, and the protector is simply used as a pad to protect the tail from rubbing, though, if desired to keep the tail clean from manure in stables, the full protector may be used.

The protector may be lined and stuffed when used as a pad to prevent rubbing in cars or stables.

What I claim as my invention is—

The improved horse-tail protector or cover consisting of the body A, provided with the connecting and folding or confining straps, all arranged and combined substantially as shown and described.

JACOB BRIGGLE.

Witnesses:
  S. WOLF,
  W. BLACKSTOCK.